E. THOMSON.
SPOT WELDING MACHINE.
APPLICATION FILED MAY 10, 1913.
1,122,665.
Patented Dec. 29, 1914.
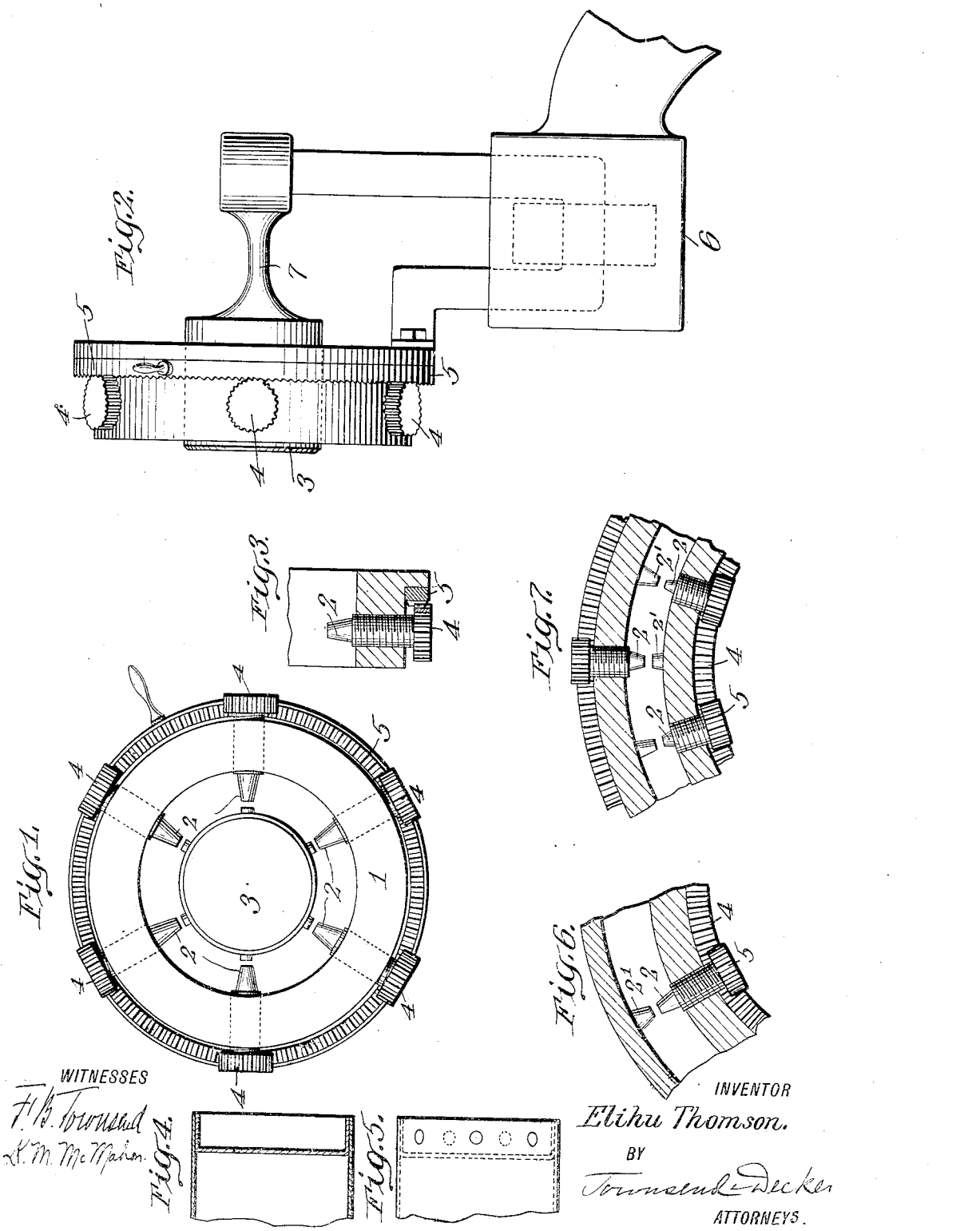

UNITED STATES PATENT OFFICE.

ELIHU THOMSON, OF SWAMPSCOTT, MASSACHUSETTS, ASSIGNOR TO THOMSON ELECTRIC WELDING COMPANY, OF LYNN, MASSACHUSETTS, A CORPORATION OF MASSACHUSETTS.

SPOT-WELDING MACHINE.

1,122,665.  Specification of Letters Patent.  Patented Dec. 29, 1914.

Application filed May 10, 1913. Serial No. 766,732.

*To all whom it may concern:*

Be it known that I, ELIHU THOMSON, a citizen of the United States, and a resident of Swampscott, in the county of Essex and State of Massachusetts, have invented certain new and useful Improvements in Spot-Welding Machines, of which the following is a specification.

My invention relates to the construction of an electrical spot welding apparatus whereby a joint or seam extending around a sheet metal object and made up of a series of electrically welded spots may be formed, as for instance a seam uniting a cylindrical sheet metal body to its head or end.

One of the special purposes of the invention is to avoid the buckling or dragging of the sheet metal material which is liable to occur when the attempt is made to make the seam by welding the spots one at a time.

In the accompanying drawings Figure 1 is a plan of an apparatus embodying my invention. Fig. 2 is a side elevation of the same apparatus shown as connected to an electric transformer. Fig. 3 is a section through a detail portion. Fig. 4 shows the class of work that may be welded in the machine. Fig. 5 is the same piece of work in side view and shows the line of spots forming the seam. Figs. 6 and 7 illustrate modifications in the disposition of the electrodes of the machine.

1 is an annular or endless conducting support like copper, carrying a series of radially disposed welding electrodes and bolted as shown or otherwise firmly fastened to one terminal of the copper secondary bar of the transformer 6. Six electrodes 2 are shown, although a greater or less number may be employed according to the dimensions of the work and the number of spot welds which it is desired to make at the same time.

The machine is organized to permit a number of spot welds to be made spaced apart equally and then allow the number to be doubled, trebled, quadrupled, &c., as the strength of the seam demands, by simply rotating the work to bring the parts thereof intermediate of the spots previously welded in position opposite the electrodes. The electrodes 2 are capable of being advanced radially into or withdrawn from engagement with the surface of the sheet metal along the line of the spot-welded seam. Coöperating with them for making a welded seam in work of a nature such as shown in Figs. 4 and 5 is a mandrel 3 adapted to support the work under the pressure applied by the electrodes 2 and forming or carrying the opposite electrodes which coöperate with electrodes 2 to make the spot welds. The mandrel 3 is preferably a body of conducting material like copper and is fastened or mounted on the opposite terminal of the secondary and is arranged as shown within the copper ring or annulus 1. As well understood in the art, the electrode or mandrel 3 may have a plain surface or, as indicated, projections 2' may extend therefrom as pointed electrodes coöperating with electrodes 2. The electrodes 2 may be operated one at a time to cause them to clamp the work, but preferably they are operated simultaneously. The arrangement, as will be obvious, is like a universal chuck when the electrodes or jaws 2 are set simultaneously.

Obviously various mechanical constructions could be employed for the purpose, such as cams, levers, or the like, but preferably each electrode is mounted on a screw body which enters the support 1 radially and has a pinion 4 on its outer end. These pinions all engage a properly mounted circular rack or crown wheel 5 which may be operated by means of a suitable handle or other mechanism to cause the electrodes to move in or out toward the central electrode or the mandrel 3. By bringing the electrodes all into engagement with the work so that they will clamp it at the same time the work will be held securely and so that when the current is put on the welds are made and the seam formed without any dragging or buckling of the cylinder on its head. If it is desired to increase the number of spot welds forming the seam to give additional strength, the work may be rotated in the annular space between the electrodes and the operation repeated at points intermediate the points previously welded.

Fig. 5 shows in full lines the position, say, of the first set of welds and in dotted lines the position of the second set, intermediate. Other welds might be made between the positions shown.

In the case of very large work, it is evident that the movable electrodes may be mounted upon support 3 or at the inside of the annular space which receives the end of the cylindrical sheet metal body as shown in Fig. 6. Also, as indicated in Fig. 7, there may be two sets of movable electrodes, one external and the other internal. One of these sets may be operated before the other, and welding done on the sheet metal cylinder by all sets at the same time, or one set may be operated and the welding done by them followed by the clamping and welding by the other set. While it is convenient after the work has been properly clamped in the electrodes, all clamping the same at once, to weld the spots simultaneously, this clearly is not necessary, as suitable provision might be made whereby the current could be passed through one electrode, then another, or through any desired number at a time. The electrodes might be at angles instead of being perpendicular to tangents of the circle and likewise they might be inclined to the axis of the cylinder or circle in which they are disposed.

The apparatus with the various modifications indicated as to the direction of the movement of the electrodes is adapted to forming a welded seam circumscribing the desired area or portion of the work, said seam being primarily composed of a line of electrically welded spots welded by the clamping electrodes which individually form the individual spots.

The mandrel carrying the one set of electrodes and mounted as shown within the ring 1 is preferably mounted so as to be somewhat elastic or yielding under the pressure of the coöperating electrodes 2, so as to even up the pressure all around when the electrodes 2 are forced in against the work. This may be accomplished by thinning the part 7 which carries the mandrel directly, or any other desired means may be employed for equalizing the pressure by allowing the work and engaging parts to yield, as for instance each electrode 2 might be capable of yielding independently of the others upon its own screw support, as well understood in the art.

What I claim as my invention is:—

1. In an electrical seam welding apparatus, the combination of an annular or endless conducting support attached to one terminal of a transformer secondary and carrying a multiplicity of converging welding electrodes and a coöperating mandrel arranged within them and forming a coöperating electrode.

2. In an electrical seam welding apparatus, the combination of a multiplicity of converging welding electrodes and a coöperating mandrel arranged within them and flexibly or yieldably mounted to yield in all directions.

3. An apparatus for forming circular seams in cylindrical sheet metal bodies by the electric welding process, comprising a series of converging welding electrodes mounted in an endless conducting support secured to one terminal of a welding transformer and a central coöperating electrode mounted upon and forming the other electrical terminal of said transformer.

4. In a seam welding apparatus, the combination substantially as described, of an endless conducting mass of metal supported upon and in connection with one terminal of a transformer secondary and open at its center, a multiplicity of radially disposed welding electrodes mounted upon and movable on said body with welding points projecting toward the center space and a coöperating mandrel of conducting material projecting into said space and mounted upon and in electrical connection with the opposite terminal of said transformer secondary.

5. In an apparatus for forming spot-welded seams in sheet metal, the combination of a series of welding electrodes carried by screw bodies and adapted to engage the work simultaneously along the line of the spot welded seam, a conducting body of annular form carrying said screw bodies and forming one terminal of an electric welding transformer, means for turning a multiplicity of said screw bodies simultaneously and a coöperating mandrel forming the opposite electrode and mounted upon the opposite terminal of the transformer secondary.

6. In a spot welding machine, an annular body of conducting material carrying a series of radially disposed electrodes mounted on screw bodies each provided with a pinion and a circular rack engaging said pinions.

Signed at Lynn in the county of Essex and State of Massachusetts this first day of May, A. D. 1913.

ELIHU THOMSON.

Witnesses:
JOHN A. MCMANUS, Jr.,
HENRY A. ANDERSEN.